United States Patent

Howarth et al.

(10) Patent No.: US 8,904,751 B2
(45) Date of Patent: Dec. 9, 2014

(54) THRUST REVERSER ASSEMBLY AND METHOD OF OPERATION

(75) Inventors: Graham Frank Howarth, Middletown, DE (US); Bryan Wayne Hughes, Baltimore, MD (US)

(73) Assignee: Middle River Aircraft Systems, Baltimore, MD (US)

( * ) Notice: Subject to any disclaimer, the term of this patent is extended or adjusted under 35 U.S.C. 154(b) by 299 days.

(21) Appl. No.: 13/459,547

(22) Filed: Apr. 30, 2012

(65) Prior Publication Data

US 2013/0284822 A1 Oct. 31, 2013

(51) Int. Cl.
*F02K 1/70* (2006.01)

(52) U.S. Cl.
USPC ..... 60/204; 60/226.2; 239/265.31; 244/110 B

(58) Field of Classification Search
CPC ............. F02K 1/72; F02K 1/70; B64D 33/02; B64D 2033/0226; F02C 7/04
USPC ..................... 60/226.2, 230, 204; 239/265.19, 239/265.31, 265.29; 244/110 B
See application file for complete search history.

(56) References Cited

U.S. PATENT DOCUMENTS

| 3,036,431 | A | * | 5/1962 | Vdolek | 60/229 |
| 3,503,211 | A | * | 3/1970 | Holman et al. | 60/226.2 |
| 7,874,142 | B2 | | 1/2011 | Beardsley | |
| 2009/0321561 | A1 | * | 12/2009 | Andre et al. | 244/110 B |

* cited by examiner

*Primary Examiner* — Ted Kim
(74) *Attorney, Agent, or Firm* — General Electric Company; William Scott Andes

(57) ABSTRACT

A thrust reverser assembly and operation suitable for high-bypass turbofan engines. The thrust reverser assembly includes a translating cowl mounted to a nacelle of an engine and adapted to translate in an aft direction of the engine. The translating cowl has a radially inner wall that defines a radially outer flow surface of a bypass duct of the engine. The thrust reverser assembly includes blocker doors axially guided adjacent first ends thereof by a fixed structure and pivotally and slidably connected along lengths thereof to the inner wall of the translating cowl so that translation of the translating cowl in the aft direction causes each blocker door to move from a stowed position to a deployed position as a result of the blocker door sliding at its first end relative to the fixed structure and sliding along its length relative to the inner wall of the translating cowl.

20 Claims, 5 Drawing Sheets

THRUST REVERSER ASSEMBLY AND METHOD OF OPERATION

BACKGROUND OF THE INVENTION

The present invention relates to high-bypass gas turbine engines, and more particularly to thrust reversers utilized in high-bypass turbofan engines to provide thrust reversal by diverting air from a fan bypass duct.

FIG. 1 schematically represents a high-bypass turbofan engine 10 of a type known in the art. The engine 10 is schematically represented as including a nacelle 12 and a core engine (module) 14. A fan assembly 16 located in front of the core engine 14 includes a spinner nose 20 projecting forwardly from an array of fan blades 18. The core engine 14 is schematically represented as including a high-pressure compressor 22, a combustor 24, a high-pressure turbine 26 and a low-pressure turbine 28. A large portion of the air that enters the fan assembly 16 is bypassed to the rear of the engine 10 to generate additional engine thrust. The bypassed air passes through an annular-shaped bypass duct 30 between the nacelle 12 and an inner core cowl 36, and exits the duct 30 through a fan exit nozzle 32. The core cowl 36 defines the radially inward boundary of the bypass duct 30, and provides an aft core cowl transition surface to a primary exhaust nozzle 38 that extends aftward from the core engine 14. The nacelle 12 defines the radially outward boundary of the bypass duct 30, and the bypassed fan air flows between bypass duct flow surfaces defined by the nacelle 12 and core cowl 36 before being exhausted through the fan exit nozzle 32.

The nacelle 12 is typically composed of three primary elements that define the external boundaries of the nacelle 12: an inlet assembly 12A, a fan cowl 12B interfacing with an engine fan case that surrounds the fan blades 18, and a thrust reverser assembly 12C located aft of the fan cowl 12B. The thrust reverser assembly 12C comprises three primary components: a translating cowl 34A mounted to the nacelle 12, a cascade 34B schematically represented within the nacelle 12, and blocker doors 34C adapted to be pivotally deployed from stowed positions shown in FIG. 1 as radially inward from the cascade 34B. The inner core cowl 36 of the core engine 14 is also part of the thrust reverser assembly 12C, and the fore end of each blocker door 34C is pivoted into engagement with the inner core cowl 36 when the door 34C is fully deployed. The cascade 34B is a fixed structure of the nacelle 12, whereas the translating cowl 34A is adapted to be translated aft to expose the cascade 34B and deploy the blocker doors 34C into the duct 30 using a link arm 34D, causing bypassed air within the duct 30 to be diverted through the exposed cascade 34B and thereby provide a thrust reversal effect. While two blocker doors 34C are shown in FIG. 1, a plurality of blocker doors 34C are typically circumferentially spaced around the circumference of the nacelle 12.

In a conventional thrust reverser design used in the high bypass turbofan engine 10, the cascade 34B is covered by the stowed blocker doors 34C when the thrust reverser assembly 12C is not in use, that is, during normal in-flight operation of the engine 10. A drawback of this type of conventional construction is that the blocker doors 34C define portions of the fan duct outer flow surfaces, and surface interruptions (gaps and steps) and duct leakage resulting from the doors 34C can increase aerodynamic drag and reduce aerodynamic performance. The link arms 34D associated with the blocker doors 34C protrude into the fan duct flow path to further increase aerodynamic drag and other flow perturbation that can cause aerodynamic or acoustic inefficiencies. In addition, the blocker doors 34C incorporate only limited areas of acoustic treatment as well as create discontinuities in the translating cowl acoustic treatment, and are exposed to damage and wear-inducing conditions during normal engine operation. These aspects of conventional thrust reversers can significantly reduce engine performance, engine noise attenuation, specific fuel consumption, and operational reliability.

BRIEF DESCRIPTION OF THE INVENTION

The present invention provides a thrust reverser assembly and operation that are suitable for high-bypass turbofan engines of types used in aircraft.

According to a first aspect of the invention, the thrust reverser assembly includes a translating cowl mounted to a nacelle of a high-bypass turbofan engine and adapted to translate in an aft direction of the engine. The translating cowl has a radially inner wall that defines a radially outer flow surface of a bypass duct of the engine. The thrust reverser assembly further includes a fixed structure that is located within the nacelle and includes at least one opening that is exposed to the bypass duct when the translating cowl is translated in the aft direction. Blocker doors are mounted to the nacelle and have stowed positions and deployed positions. Each blocker door has a first end, an oppositely-disposed second end, and a length therebetween. Each blocker door is axially guided adjacent its first end by the fixed structure and is pivotally and slidably connected along its length to the inner wall of the translating cowl so that translation of the translating cowl in the aft direction causes each blocker door to move from its stowed position to its deployed position as a result of the blocker door sliding at its first end relative to the fixed structure and sliding along its length relative to the inner wall of the translating cowl. The inner wall of the translating cowl is between each blocker door and the bypass duct when the blocker doors are in their stowed positions, and the second end of each blocker door projects into the bypass duct and diverts bypass air within the bypass duct through the opening of the fixed structure when the blocker doors are in their deployed positions.

According to a second aspect of the invention, a method of operating a thrust reverser assembly installed on a high-bypass turbofan engine entails stowing blocker doors in stowed positions so that the inner wall of a translating cowl of the engine is between each door and the bypass duct of an engine and between the bypass duct and a fixed structure within the nacelle of the engine. The translating cowl is then translated in an aft direction of the engine, resulting in the fixed structure and at least one opening thereof being exposed to the bypass duct as the translating cowl is translated in the aft direction. The blocker doors are then deployed from their stowed positions to their deployed positions as the translating cowl is translated in the aft direction. Each blocker door has a first end axially guided by the fixed structure, an oppositely-disposed second end, and a length therebetween pivotally and slidably connected to the inner wall of the translating cowl. Each blocker door is deployed as a result of sliding at its first end relative to the fixed structure and sliding along its length relative to the inner wall of the translating cowl. The deploying step causes each blocker door to project into the bypass duct and divert bypass air within the bypass duct through the opening of the fixed structure.

Other aspects of the invention include high-bypass gas turbofan engines equipped with a thrust reverser assembly having the elements and/or operation described above.

A technical effect of the invention is that blocker doors of the thrust reverser assembly can be completely stowed within the nacelle of the engine, such that the blocker doors are concealed by the fan duct flow surface defined by the translating cowl. As a result, the blocker doors are only exposed during use of the thrust reverser system and therefore have reduced exposure to damage/wear inducing conditions. The invention is also capable of significantly reducing aerodynamic drag and other flow perturbations that would be otherwise attributed to the blocker doors and their associated link arms, which reduce aerodynamic and/or acoustic efficiency. Notably, concealment of the blocker doors in this manner also facilitates the ability to acoustically treat essentially all of the flow surfaces that define the fan duct outer flow path in the critical area immediately aft of the engine fan. The thrust reverser assembly achieves these results while also being capable of having reduced design complexity, manufacturing complexity, cost, and weight associated with the assembly and its components, including the blocker doors, translating cowl, and fixed structure of the nacelle.

Other aspects and advantages of this invention will be better appreciated from the following detailed description.

BRIEF DESCRIPTION OF THE DRAWINGS

FIGS. 2 through 4 are isolated axial (side) sectional views representing operation stages of a thrust reverser assembly according to one embodiment of the present invention, wherein FIGS. 2 through 4 depict a stowed position (FIG. 2), a partially deployed position (FIG. 3), and a fully deployed position of a blocker door associated with the thrust reverser assembly (FIG. 4).

DETAILED DESCRIPTION OF THE INVENTION

Figure 1:
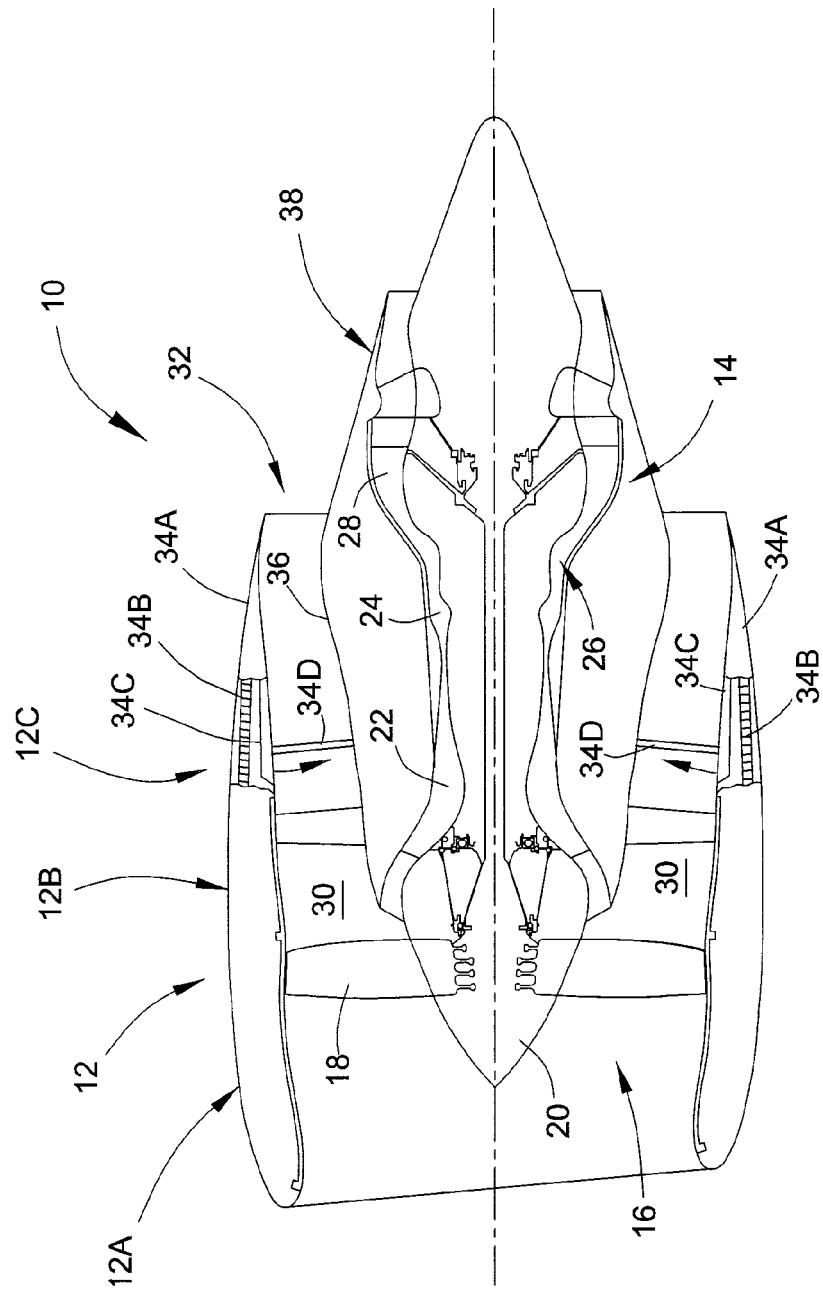
FIG. 1 schematically represents a cross-sectional view of a high-bypass turbofan engine.

FIGS. 2 through 5 represent views of a region of a gas turbine engine containing a thrust reverser assembly. The thrust reverser assembly represented in FIGS. 2 through 5 can be installed in a high-bypass gas turbofan engine of the type represented in FIG. 1 and therefore, as a matter of convenience, the same numbers used in FIG. 1 to identify the engine 10 and its components will be used in FIGS. 2 through 5 to identify the same or functionally equivalent components. As such, it should be understood that FIGS. 2 through 5 depict a thrust reverser assembly 12C located within the nacelle 12 of the engine 10 and aft of the fan cowl 12B. It should be further understood that a core cowl 36 defines the radially inward boundary of a bypass duct 30, the nacelle 12 defines the radially outward boundary of the bypass duct 30, and bypassed air of the engine 10 passes through the bypass duct 30 and exits through a fan exit nozzle 32 (not shown in FIGS. 2 through 5). Other structural and functional aspects of the engine 10 can be understood from the preceding discussion of FIG. 1, and therefore will not be repeated here.

As previously discussed in reference to FIG. 1, the thrust reverser assembly 12C comprises three primary components: a translating cowl 34A mounted to the nacelle 12, a cascade 34B within the nacelle 12, and blocker doors 34C. FIGS. 2 through 5 represent one of the blocker doors 34C, though it should be understood that the blocker door 34C is preferably one of a plurality of blocker doors 34C circumferentially spaced around the circumference of the nacelle 12. As evident from FIGS. 2 through 4, the door 34C is adapted to deploy from a stowed position, shown in FIG. 2 as radially inward of the cascade 34B, through a partially deployed position shown in FIG. 3, to a fully deployed position shown in FIG. 4.

Figure 2:
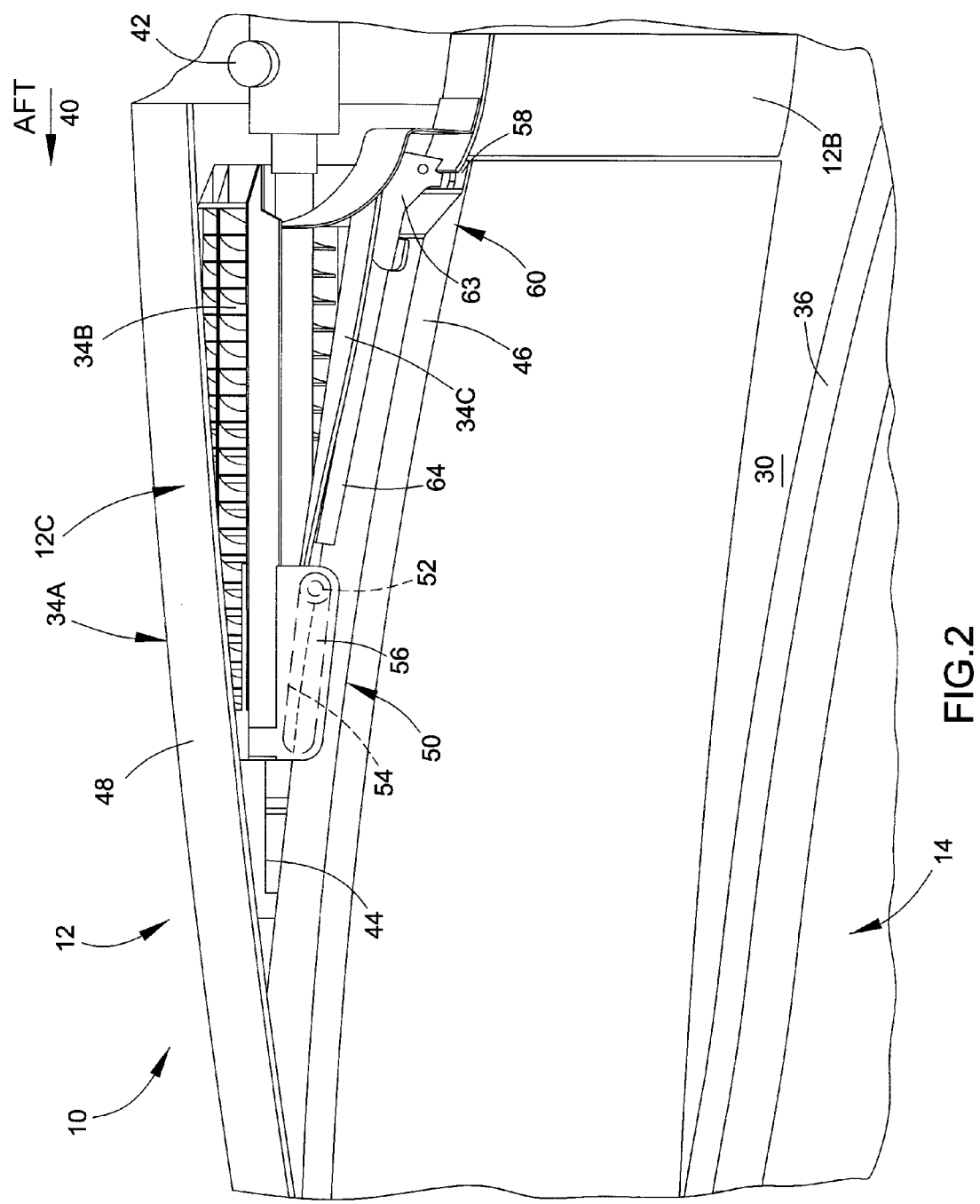
Figure 3:
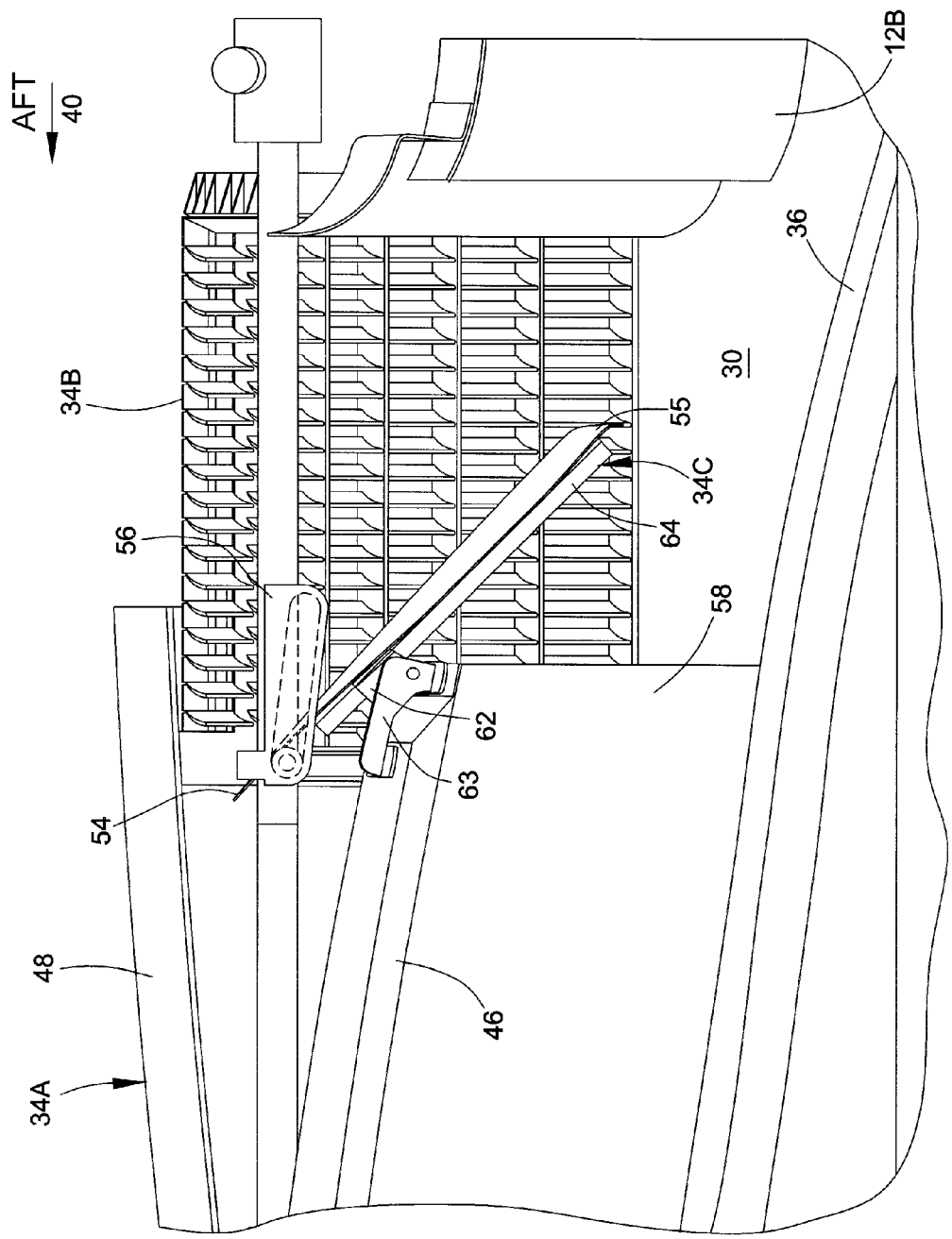
Figure 4:
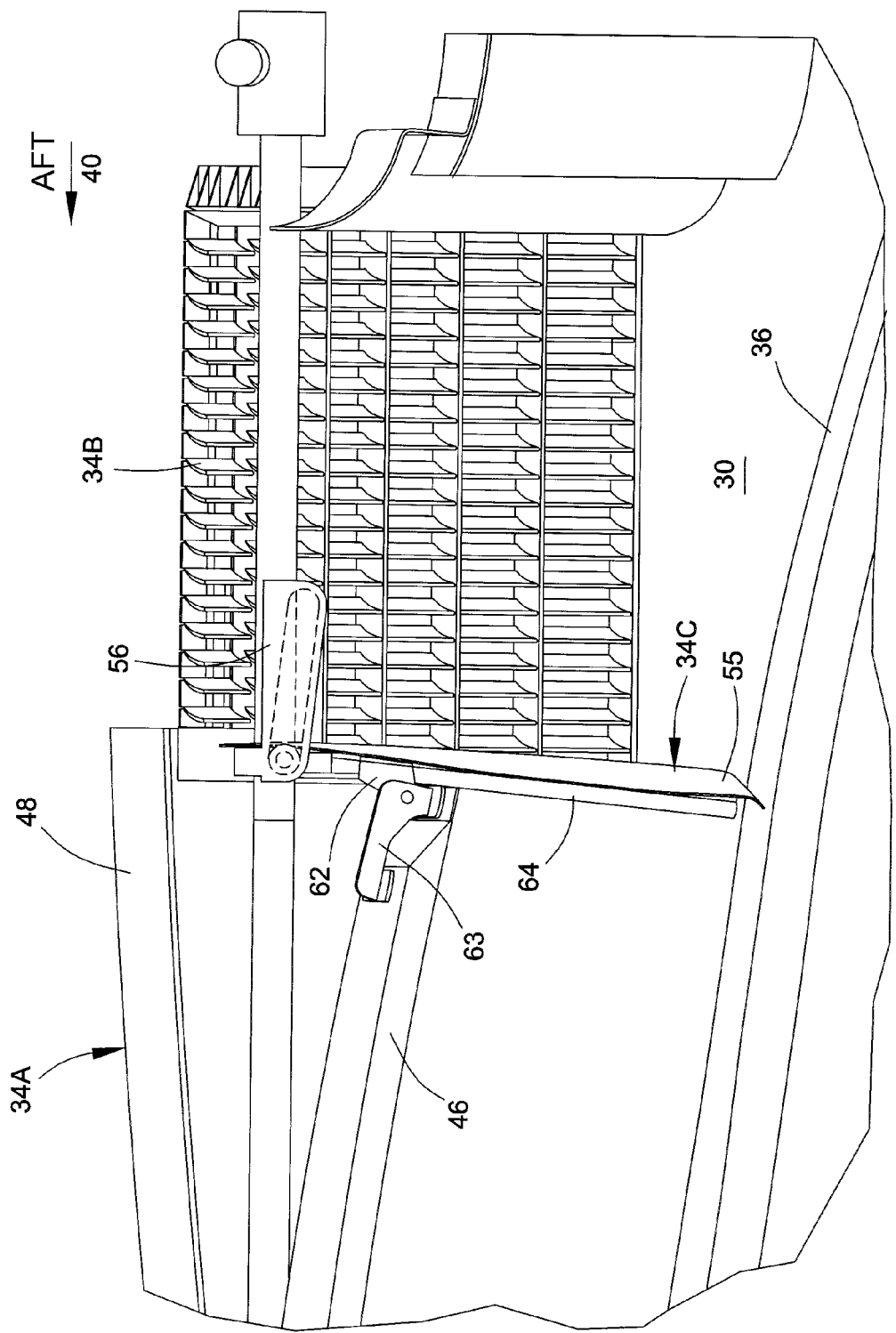
Figure 5:
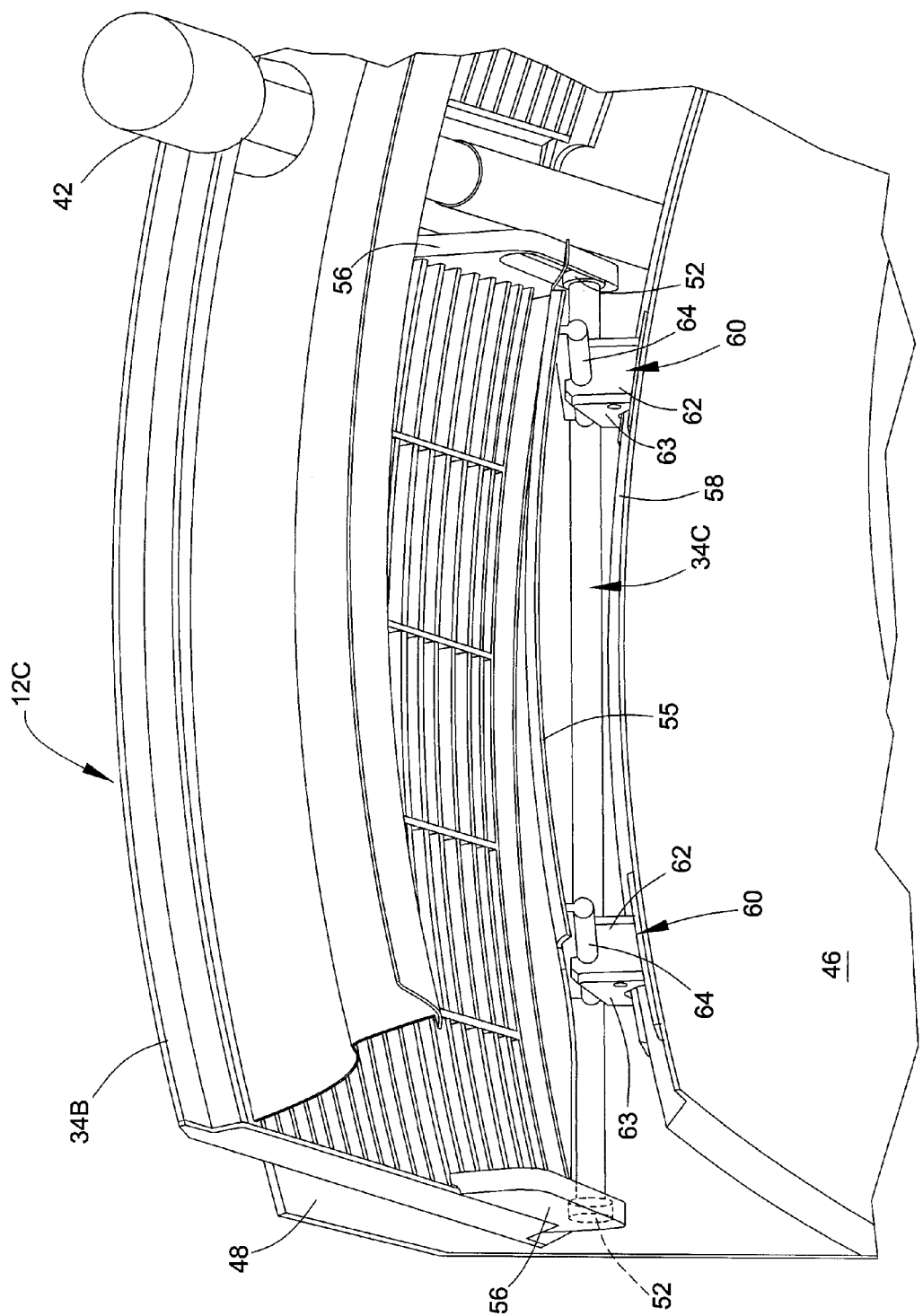
FIG. 5 is an isolated axial view of the assembly of FIGS. 2 through 4 looking aft in FIG. 2.

Whereas the cascade 34B is an element of the fixed structure of the nacelle 12, meaning that the cascade 34B does not move during the operation of the thrust reverser assembly 12C, the translating cowl 34A is adapted to be translated in the aft direction 40 of the engine 10 to expose the cascade 34B and deploy the blocker door 34C into the duct 30. For this purpose, FIGS. 2 through 4 represent the translating cowl 34A as being coupled to an actuator 42 mounted to the nacelle (12). The actuator 42 can be of any suitable type.

Translation of the translating cowl 34A in the aft direction 40 causes the blocker door 34C to be deployed into the bypass duct 30 in a manner represented in FIGS. 2 through 4. From FIG. 4, it can be appreciated that, when fully deployed, the blocker door 34C extends across the entire radial width of the duct 30 and causes bypassed air within the duct 30 to be diverted through the exposed cascade 34B and thereby provide a thrust reversal effect. Prior to translation of the translating cowl 34A, and therefore while the thrust reverser assembly 12C is not in use, the stowed blocker door 34C is positioned radially inward of the cascade 34B and both the cascade 34B and blocker door 34C are completely concealed by the translating cowl 34A. More particularly, the cascade 34B and blocker door 34C are contained within a cavity 44 defined between radially inner and outer walls 46 and 48 of the translating cowl 34A, such that the radially inner wall 46 of the translating cowl 34A completely separates the cascade 34B and blocker door 34C from the bypass duct 30. As such, the inner wall 46 of the translating cowl 34A defines a portion of the radially outer flow surface of the bypass duct 30. An advantage of this configuration is that the blocker door 34C does not define any portion of the radially outer flow surface of the bypass duct 30 during normal engine operation, and therefore does not create surface interruptions (gaps and steps) or cause duct leakage that would increase aerodynamic drag and reduce aerodynamic performance of the engine 10. Furthermore, the blocker door 34C is not exposed to damage and wear-inducing conditions during normal in-flight engine operations. Another advantage is that the entire inner wall 46 of the translating cowl 34A can incorporate an uninterrupted acoustic treatment (not shown) of its entire surface area to promote increased engine noise attenuation.

The blocker door 34C is shown in FIGS. 2 through 5 as being coupled to the fixed structure of the nacelle 12, in this case, the cascade 34B, as well as coupled to the translating cowl 34A, in this case, the inner wall 46 thereof. The connection between the blocker door 34C and cascade 34B is shown as a guided connection, and in the embodiment of FIGS. 2 through 5 this guided connection is created by roller and guide track assemblies 50. Specifically, one or more rollers 52 are mounted to the blocker door 34C adjacent its trailing end 54 (corresponding to the aft direction 40), and each roller 52 is guided by a guide track 56 attached in any suitable manner to the cascade 34B or its support structure. As such, the blocker door 34C is able to move in the fore and aft directions relative to the cascade 34B. The connection between the blocker door 34C and inner wall 46 of the translating cowl 34A is shown as a rotating connection, and in the embodiment of FIGS. 2 through 5 this rotating connection is created by one or more journal-type pivoting assemblies 60. In the embodiment of FIGS. 2 through 5, partial journals or sleeves 62 are pivotally mounted in pivot fittings 63 adjacent the leading edge 58 of the inner wall 46 of the translating cowl 34, and roller shafts 64 (or another suitable device) formed or otherwise disposed along the length of the blocker door 34C (shown as extending from the trailing end 54 of the door 34C to an oppositely-disposed leading end 55 of the door 34C) are slidably received in the pivoting sleeves 62. As such, the blocker door 34C is also able to move in the fore and aft directions relative to the translating cowl 34A.

As evident from the deployment sequence of FIGS. 2 through 4, as the translating cowl 34A is translated in the aft direction 40 to deploy the thrust reverser assembly 12C, the rollers 52 travel along their respective guide tracks 56 and the pivoting sleeves 62 travel along their respective shafts 64. Each roller 52 is initially located at a leading end of its guide track 56 (FIG. 2), and travels toward a trailing end of its guide track 56 during deployment. In the embodiment represented in FIGS. 2 through 5, the length of each guide track 56 is less than the travel of the translating cowl 34A and less than the length of its blocker door 34C (between its trailing and leading ends 54 and 55). The travel of each roller 52 along its respective guide track 56 is preferably the first to be initiated during the translation of the translating cowl 34A. During this initial phase of operation, the blocker door 34C travels in the aft direction 40 with the translating cowl 34A, but the blocker door 34C preferably does not pivot (or pivot to any significant degree) about its rollers 52 relative to the cascade 34B. In addition, travel of the pivoting sleeves 62 along their respective shafts 64 preferably does not occur until the rollers 52 have traveled the full lengths of their respective guide tracks 56 (FIG. 3).

Because the cascade 34A and its guide tracks 56 are part of the fixed structure of the nacelle 12 and the lengths of the guide tracks 56 are less than the full distance that the translating cowl 34A travels, the rollers 52 and guide tracks 56 cooperate to limit the travel of the blocker door 34C in the aft direction 40 as the translating cowl 34A continues to travel aftward. Once the rollers 52 have traveled the full lengths of their respective guide tracks 56 (FIG. 3), further aftward translation of the cowl 34A causes the pivoting assemblies 60 on the cowl 34A to travel along the lengths of the shafts 64 to which their pivoting sleeves 62 are slidably coupled. In the embodiment of FIGS. 2 through 5, each pivoting assembly 60 travels from a leading end of its shaft 64 (FIG. 2) located adjacent the leading end 55 of the door 34C, toward a trailing end of its shaft 64 (FIGS. 3 and 4) located adjacent the trailing end 54 of the door 34C. Furthermore, as evident from FIGS. 3 and 4, further aftward translation of the translating cowl 34A causes the pivoting sleeves 62 to pivot the blocker door 34C about its rollers 52 relative to the cascade 34B and radially inward into the bypass duct 30. In the stages of operation represented by FIGS. 3 and 4, the cascade 34B is gradually exposed by the blocker door 34C and the inner wall 46 of the translating cowl 34A to the bypass duct 30, and full deployment of the blocker door 34C (FIG. 4) results in bypassed air within the duct 30 being diverted from the duct 30 through the cascade 34B.

The rotating and sliding joints of the blocker door 34C are preferably geometrically and physically designed to provide a desired sequence and rate of deployment for the blocker doors 34C. In the deployed position, multiple blocker doors 34C can be configured to interface together to yield a desired percentage of duct blockage, which may be further optimized by seals (not shown) provided along the edges of the blocker doors 34C. The operation described above in reference to FIGS. 2 through 5 can be adjusted or modified by equipping the guide tracks 56 with adjustable end stops (not shown) to enable adjustment of the travel limits, provide for energy absorption, and/or provide a system pre-load in the stowed and/or deployed positions to reduce wear. In addition or alternatively, the shafts 64 of the blocker door 34C and/or the pivoting sleeves 62 of the translating cowl 34A may include adjustable bump stop features to provide travel limitation/adjustment, load absorption, and load transfer capabilities. It may also be desirable to include a telescopic link or spring-loaded cable attachment between each blocker door 34C and the forward fixed structure of the thrust reverser assembly 12C to provide additional door rotation restraint, energy absorption or load transfer.

While the embodiment of FIGS. 2 through 5 depict each blocker door 34C as being equipped with two guided connections provided by the roller and track assemblies 50 at its trailing end 54 and two rotating connections provided by the pivoting assemblies 60, other configurations are foreseeable, including a three-point attachment system, for example, two guided connections in combination with a single rotating connection, or a single guided connection in combination with two rotating connections.

From the above discussion and the depiction in FIGS. 1 through 5, it should be appreciated that the operation of the blocker doors 34C and their guided and rotating connections are not dependent on any particular type of cascade design, and in fact the invention could be installed in a non-cascade reverser design in which the bypassed air is diverted from the bypass duct 30 through openings of various configurations. Furthermore, whereas the blocker door 34C represented in FIGS. 2 through 5 has a rigid construction that does not intentionally bend, flex or fold during its deployment, blocker doors having any of these capabilities are also within the scope of the invention. It should be further understood that an extended length blocker door or folding door that extends as it is deployed may be utilized to provide a blocker door that, when deployed, is capable of extending into the external air flow to provide additional retarding drag. Finally, it should also be appreciated that the thrust reverser assembly 12C and its individual components can be constructed of various materials, including metallic, plastic and composite materials commonly used in aerospace applications and fabricated by machining, casting, molding, lamination, etc., and combinations thereof.

While the invention has been described in terms of a specific embodiment, it is apparent that other forms could be adopted by one skilled in the art. For example, the engine 10, the thrust reverser assembly 12C, and their components could differ in appearance and construction from the embodiment shown in the figures, the functions of each component of the thrust reverser assembly 12C could be performed by components of different construction but capable of a similar (though not necessarily equivalent) function, and various materials could be used in the construction of these components. Therefore, the scope of the invention is to be limited only by the following claims.

The invention claimed is:

1. A thrust reverser assembly for a gas turbine engine having a core engine, a nacelle surrounding the core engine, and a bypass duct defined by and between the nacelle and the core engine, the thrust reverser assembly comprising:
    a translating cowl mounted to the nacelle and adapted to translate a distance in an aft direction of the gas turbine engine, the translating cowl having a radially inner wall that defines a radially outer flow surface of the bypass duct;
    a fixed structure within the nacelle that does not translate with the translating cowl, the fixed structure comprising at least one opening that is exposed to the bypass duct when the translating cowl is translated in the aft direction; and
    blocker doors mounted to the nacelle and having stowed positions and deployed positions, each of the blocker doors having an aftward trailing end pivotally and slidably coupled to the fixed structure, an oppositely-disposed leading second end, and a length therebetween pivotally and slidably coupled to the translating cowl so that translation of the translating cowl in the aft direction causes each of the blocker doors to move from the stowed position thereof to the deployed position thereof by initially translating in the aft direction with the translating cowl and relative to the fixed structure while the trailing end thereof slidably travels relative to the fixed structure and then by pivoting toward the aft direction relative to the fixed structure while pivoting at the trailing end thereof and the length thereof pivots and slidably travels relative to the translating cowl, wherein the inner wall of the translating cowl is between each of the blocker doors and the bypass duct when the blocker doors are in their stowed positions, and wherein the leading end of each of the blocker doors projects into the bypass duct and diverts bypass air within the bypass duct through the opening of the fixed structure when the blocker doors are in their deployed positions.

2. The thrust reverser assembly according to claim 1, wherein each of the blocker doors is pivotally and slidably coupled at the trailing end thereof by at least one track and roller assembly that is connected to the fixed structure and causes the blocker doors to translate aft with the translating cowl and thereafter pivot relative to the fixed structure.

3. The thrust reverser assembly according to claim 2, wherein the track and roller assemblies comprise guide tracks mounted to the fixed structure and rollers residing in the guide tracks and mounted at the trailing ends of the blocker doors.

4. The thrust reverser assembly according to claim 3, wherein the guide tracks have lengths along which the rollers travel, and the length of each of the guide tracks is less than the distance that the translating cowl translates in the aft direction so that each of the blocker doors does not translate with the translating cowl while the lengths of the blocker doors pivot and slidably travel relative to the translating cowl.

5. The thrust reverser assembly according to claim 1, wherein each of the blocker doors is pivotally and slidably connected to the inner wall of the translating cowl by at least one pivoting sleeve.

6. The thrust reverser assembly according to claim 5, wherein the pivoting sleeves are pivotally mounted to the inner wall of the translating cowl.

7. The thrust reverser assembly according to claim 6, wherein each of the blocker doors further comprises at least one shaft slidably received in one of the pivoting sleeves.

8. The thrust reverser assembly according to claim 1, wherein the opening of the fixed structure is a cascade.

9. A high-bypass gas turbofan engine having a core engine, a nacelle surrounding the core engine, and a bypass duct defined by and between the nacelle and the core engine, the nacelle comprising a fan case and a thrust reverser assembly disposed axially aft of the fan case, the thrust reverser assembly comprising:
a translating cowl mounted to the nacelle and adapted to translate a distance in an aft direction of the gas turbine engine, the translating cowl having a radially inner wall that defines a radially outer flow surface of the bypass duct;
a fixed structure within the nacelle that does not translate with the translating cowl, the fixed structure comprising at least one opening that is exposed to the bypass duct when the translating cowl is translated in the aft direction; and
blocker doors mounted to the nacelle and having stowed positions and deployed positions, each of the blocker doors having an aftward trailing end pivotally and slidably coupled to the fixed structure, an oppositely-disposed leading end, and a length therebetween pivotally and slidably coupled to the translating cowl so that translation of the translating cowl in the aft direction causes each of the blocker doors to move from the stowed position thereof to the deployed position thereof by initially translating in the aft direction with the translating cowl and relative to the fixed structure while the trailing end thereof slidably travels relative to the fixed structure and then by pivoting toward the aft direction relative to the fixed structure while pivoting at the trailing end thereof and the length thereof pivots and slidably travels relative to the translating cowl, wherein the inner wall of the translating cowl is between each of the blocker doors and the bypass duct when the blocker doors are in their stowed positions, and wherein the leading end of each of the blocker doors projects into the bypass duct and diverts bypass air within the bypass duct through the opening of the fixed structure when the blocker doors are in their deployed positions.

10. The high-bypass gas turbofan engine according to claim 9, wherein each of the blocker doors is pivotally and slidably coupled at the trailing end thereof by at least one track and roller assembly that is connected to the fixed structure and causes the blocker doors to translate aft with the translating cowl and thereafter pivot relative to the fixed structure.

11. The high-bypass gas turbofan engine according to claim 10, wherein the track and roller assemblies comprise guide tracks mounted to the fixed structure and rollers residing in the guide tracks and mounted at the trailing ends of the blocker doors.

12. The high-bypass gas turbofan engine according to claim 11, wherein the guide tracks have lengths along which the rollers travel, and the length of each of the guide tracks is less than the distance that the translating cowl translates in the aft direction so that each of the blocker doors does not translate with the translating cowl while the lengths of the blocker doors pivot and slidably travel relative to the translating cowl.

13. The high-bypass gas turbofan engine according to claim 9, wherein each of the blocker doors is pivotally and slidably connected to the inner wall of the translating cowl by at least one pivoting sleeve.

14. The high-bypass gas turbofan engine according to claim 13, wherein the pivoting sleeves are pivotally mounted to the inner wall of the translating cowl.

15. The high-bypass gas turbofan engine according to claim 14, wherein each of the blocker doors further comprises at least one shaft slidably received in one of the pivoting sleeves.

16. The high-bypass gas turbofan engine according to claim 9, wherein the opening of the fixed structure is a cascade.

17. A method of reversing thrust of a gas turbine engine having a core engine, a nacelle surrounding the core engine, a bypass duct defined by and between the nacelle and the core engine, and a translating cowl mounted to the nacelle and having a radially inner wall that defines a radially outer flow surface of the bypass duct, the method comprising:
stowing blocker doors in stowed positions thereof so that the inner wall of the translating cowl is between the bypass duct and each of the blocker doors and is between the bypass duct and a fixed structure within the nacelle that does not translate with the translating cowl;
translating the translating cowl in an aft direction of the gas turbine engine;

exposing the fixed structure and at least one opening thereof to the bypass duct as the translating cowl is translated in the aft direction; and deploying the blocker doors from the stowed positions thereof to deployed positions thereof as the translating cowl is translated in the aft direction, each of the blocker doors having an aftward trailing end pivotally and slidably coupled to the fixed structure, an oppositely-disposed leading end, and a length therebetween pivotally and slidably connected to the translating cowl, each of the blocker doors being deployed as a result of initially translating in the aft direction with the translating cowl and relative to the fixed structure while the trailing end thereof slidably travels relative to the fixed structure and then by pivoting toward the aft direction relative to the fixed structure while pivoting at the trailing end thereof and the length thereof pivots and slidably travels relative to the translating cowl, wherein the deploying step causes the leading end of each of the blocker doors to project into the bypass duct and divert bypass air within the bypass duct through the opening of the fixed structure.

18. The method according to claim 17, wherein each of the blocker doors is pivotally and slidably coupled at the trailing end thereof by at least one track and roller assembly connected to the fixed structure.

19. The method according to claim 17, wherein each of the blocker doors is pivotally and slidably connected to the inner wall of the translating cowl by at least one pivoting sleeve.

20. The method according to claim 17, wherein during the deploying step each of the blocker doors does not translate with the translating cowl while the length thereof pivots and slidably travels relative to the translating cowl.

* * * * *

UNITED STATES PATENT AND TRADEMARK OFFICE
CERTIFICATE OF CORRECTION

| | | |
|---|---|---|
| PATENT NO. | : 8,904,751 B2 | Page 1 of 1 |
| APPLICATION NO. | : 13/459547 | |
| DATED | : December 9, 2014 | |
| INVENTOR(S) | : Howarth et al. | |

It is certified that error appears in the above-identified patent and that said Letters Patent is hereby corrected as shown below:

IN THE CLAIMS

In Column 7, Line 1, in Claim 1, delete "second".

Signed and Sealed this
Twenty-ninth Day of December, 2015

Michelle K. Lee
*Director of the United States Patent and Trademark Office*